United States Patent
Basin et al.

(10) Patent No.: US 10,041,575 B2
(45) Date of Patent: Aug. 7, 2018

(54) TORSIONAL DAMPER SYSTEM

(71) Applicant: GM Global Technology Operations LLC, Detroit, MI (US)

(72) Inventors: Leonid Basin, Farmington Hills, MI (US); Dongxu Li, Troy, MI (US); Farzad Samie, Franklin, MI (US); Kumaraswamy V. Hebbale, Troy, MI (US); Gary H. Paelicke, Saline, MI (US); Clinton E. Carey, Highland, MI (US); James M. Hart, Belleville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 14/974,705

(22) Filed: Dec. 18, 2015

(65) Prior Publication Data
US 2017/0175866 A1    Jun. 22, 2017

(51) Int. Cl.
| | |
|---|---|
| F16H 47/00 | (2006.01) |
| F16H 45/02 | (2006.01) |
| F16D 13/52 | (2006.01) |
| F16D 13/58 | (2006.01) |
| F16D 25/0638 | (2006.01) |
| F16F 15/123 | (2006.01) |
| F16D 13/76 | (2006.01) |
| F16H 45/00 | (2006.01) |

(52) U.S. Cl.
CPC ............. *F16H 45/02* (2013.01); *F16D 13/52* (2013.01); *F16D 13/58* (2013.01); *F16D 13/76* (2013.01); *F16D 25/0638* (2013.01); *F16F 15/12353* (2013.01); *F16D 2300/22* (2013.01); *F16H 2045/005* (2013.01); *F16H 2045/0215* (2013.01); *F16H 2045/0226* (2013.01); *F16H 2045/0231* (2013.01); *F16H 2045/0284* (2013.01); *F16H 2045/0294* (2013.01)

(58) Field of Classification Search
CPC ............... F16H 47/02; F16D 3/12; F16D 3/14
USPC ............... 74/730.1; 464/62.1, 68.8; 192/3.28
See application file for complete search history.

(56) References Cited

U.S. PATENT DOCUMENTS

| | | |
|---|---|---|
| 2,264,002 A | 11/1941 | Patterson et al. |
| 3,059,740 A | 10/1962 | Roche |
| 3,296,887 A | 1/1967 | Larsen |
| 4,177,885 A | 12/1979 | Ross |

(Continued)

FOREIGN PATENT DOCUMENTS

WO    2008064638 A1    6/2008

*Primary Examiner* — Ha Dinh Ho (57) ABSTRACT

A damper system includes a turbine shaft rotatably connected to a torque converter having a clutch. A hydraulically actuated clutch is coupled to the turbine shaft. A first spring cage has a first cage portion connected to the hydraulically actuated clutch and a second cage portion connected to a friction plate. A first spring set is connected to the first and second cage portions. Springs of the first spring set are deflected by axial rotation between the first and second cage portions when the torque converter clutch is engaged. A second spring cage has a first cage section connected to the hydraulically actuated clutch and a second cage section connected to a torque converter turbine. A second spring set has second springs having a spring constant different than the first spring set. The second spring set springs are deflected by axial rotation between the first and second cage sections.

20 Claims, 5 Drawing Sheets

(56) References Cited

U.S. PATENT DOCUMENTS

| | | | |
|---|---|---|---|
| 4,240,532 A | 12/1980 | Blomquist | |
| 4,289,048 A | 9/1981 | Mikel et al. | |
| 4,412,606 A | 11/1983 | Loizeau | |
| 4,437,551 A | 3/1984 | Gimmler et al. | |
| 4,638,684 A | 1/1987 | Maucher | |
| 4,638,897 A | 1/1987 | Nishimura et al. | |
| 4,646,886 A | 3/1987 | Nishimura et al. | |
| 5,313,794 A | 5/1994 | Hara et al. | |
| 5,334,112 A * | 8/1994 | Nogle | F16H 45/02 192/3.23 |
| 5,456,343 A * | 10/1995 | Murata | F16H 45/02 192/107 M |
| 6,266,958 B1 | 7/2001 | Sasse et al. | |
| 6,854,580 B2 | 2/2005 | Braford, Jr. | |
| 6,910,562 B2 * | 6/2005 | Bauer | F16D 25/0635 192/214.1 |
| 7,967,561 B2 | 6/2011 | Samie et al. | |
| 8,240,442 B2 * | 8/2012 | Nakamura | F16H 45/02 192/213.1 |
| 8,579,719 B2 | 11/2013 | Mabrey | |
| 9,856,958 B2 * | 1/2018 | Basin | F16H 45/02 |
| 2003/0061809 A1 | 4/2003 | Okada et al. | |
| 2005/0262837 A1 | 12/2005 | Shue | |
| 2007/0169470 A1 | 7/2007 | Fukunaga et al. | |
| 2010/0077743 A1 | 4/2010 | Mori et al. | |
| 2012/0080281 A1 | 4/2012 | Takikawa et al. | |
| 2012/0205213 A1 | 8/2012 | Sudau et al. | |

\* cited by examiner

TORSIONAL DAMPER SYSTEM

FIELD

The present disclosure relates to torsional vibration isolators or turbine dampers, and more particularly to a powertrain having a frictional clutch incorporated with a turbine damper system to reduce torsional vibration of an engine.

BACKGROUND

The statements in this section merely provide background information related to the present disclosure and may or may not constitute prior art.

Motor vehicle engines produce torsional vibration that is undesirable to transmit through the powertrain and driveline to the motor vehicle. Typically, a torsional isolator or damper is used to isolate or reduce the torsional vibration transmitted from the engine to the transmission. The torsional isolator can be placed proximate a torque converter between a torque converter lock up clutch and an input shaft of the transmission. Known torsional dampers use one or more springs to store energy and are used to dampen an energy transfer path between the engine and the transmission. However, in certain powertrain configurations the torsional damper is insufficient to isolate the torsional vibrations. For example, in engines with rolling cylinder deactivation strategy, an increase in vibrational magnitude and a decrease in vibrational frequency occur at lower engine operating speeds and frequencies, which known single size spring design vibration dampers are insufficient to isolate within the design space, thereby requiring improvement over known vibration dampers.

Accordingly, there is room in the art for a powertrain having a vibration damper that reduces torsional vibration over a broader range of vibrational frequencies.

SUMMARY

The present disclosure provides an example of a damper system for a motor vehicle transmission having a turbine shaft rotatably connected to a torque converter. A hydraulically actuated clutch is connected to the turbine shaft and is rotatable with the turbine shaft. A first spring cage has a first cage portion connected to the hydraulically actuated clutch and a second cage portion connected to a friction plate of a torque converter clutch which is coupled with a pressure plate when the torque converter clutch is engaged. A first spring set is connected to the first and the second spring cage portions of the first spring cage. Multiple springs of the first spring set are deflected by axial rotation between the first and the second cage members when the torque converter clutch is frictionally engaged, which releasably couples the first and the second cage portions of the first spring cage to the turbine shaft.

In one example of the damper system for a motor vehicle of the present disclosure, a second spring cage has a first cage section connected to the clutch and a second cage section connected to a turbine of the torque converter.

In another example of the damper system for a motor vehicle of the present disclosure, a second spring set having multiple second springs is connected to the second spring cage each having a spring constant different than a spring constant of the springs of the first spring set, wherein the multiple second springs of the second spring set are deflected by axial rotation between the first cage section and the second cage section when the hydraulically actuated clutch is frictionally disengaged.

In yet another example of the damper system for a motor vehicle of the present disclosure, the springs of the second set of springs deflect in an angle depending on a torque vibration amplitude.

In yet another example of the damper system for a motor vehicle of the present disclosure, the hydraulically actuated clutch includes a clutch housing having multiple friction or reaction plates fixed to the clutch housing, the clutch housing connected to the turbine shaft.

In yet another example of the damper system for a motor vehicle of the present disclosure, a hub is axially rotatable with respect to the clutch housing and fixed to a turbine of the torque converter, the hub having multiple friction or reaction plates fixed to the hub, the friction or reaction plates of the hub interleaved with opposite ones of the friction or reaction plates inside the clutch housing.

In yet another example of the damper system for a motor vehicle of the present disclosure, the hydraulically actuated clutch includes a clutch housing having multiple friction or reaction plates fixed to the clutch housing, the clutch housing connected to the turbine shaft.

In yet another example of the damper system for a motor vehicle of the present disclosure, a sleeve is disposed in a longitudinal bore of the turbine shaft, the sleeve separating the longitudinal bore into an inner passage and an outer passage, the inner or the outer passage defining a path supplying hydraulic fluid to the hydraulically actuated clutch.

In yet another example of the damper system for a motor vehicle of the present disclosure, a clutch housing of the hydraulically actuated clutch has a hydraulic fluid clutch apply passage, the hydraulic fluid clutch apply passage in fluid communication with the inner or the outer passage defined by the sleeve.

In yet another example of the damper system for a motor vehicle of the present disclosure, the turbine shaft further includes multiple connecting passages extending through a wall of the turbine shaft, the connecting passages in fluid communication with the inner or the outer passage defined by the sleeve.

In yet another example of the damper system for a motor vehicle of the present disclosure, a pressure plate or a piston is rotatably supported on a clutch housing of the hydraulically actuated clutch.

In yet another example of the damper system for a motor vehicle of the present disclosure, a friction plate frictionally couples the pressure plate or the piston to a flex plate of the transmission when hydraulic pressure is applied to the pressure plate.

In yet another example of the damper system for a motor vehicle of the present disclosure, the damper is positioned in a space inside the torque converter and connected between the pressure plate or the piston and a turbine of the torque converter.

In yet another example of the damper system for a motor vehicle of the present disclosure, the hydraulically actuated clutch is connected to the turbine shaft by a spline gear, and each of the first cage portion and the first cage section are splined to the a clutch housing of the hydraulically actuated clutch.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
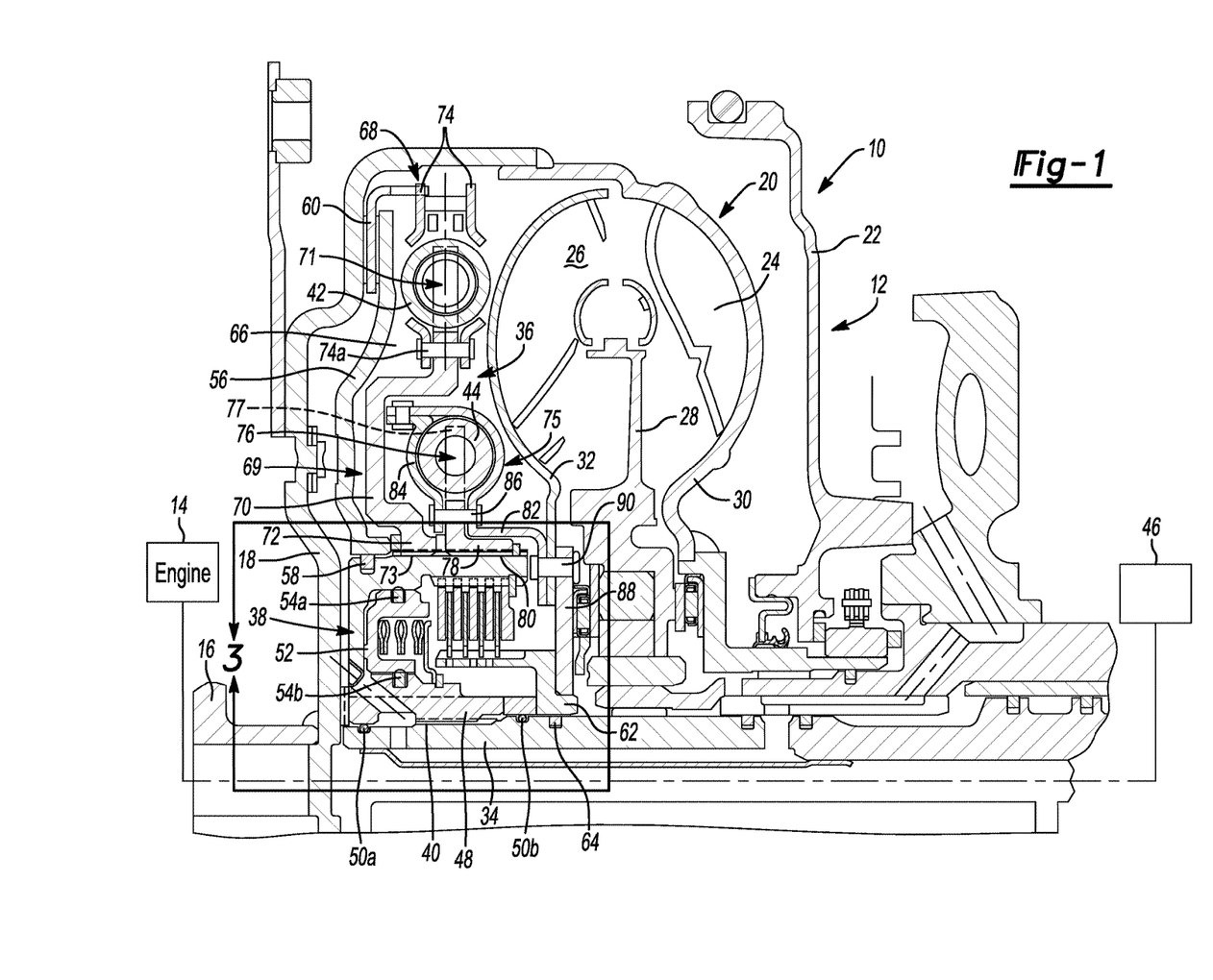
FIG. 1 is a cross sectional front elevational view of a motor vehicle transmission torque converter assembly according to the principles of the present disclosure.

With reference to FIG. 1, a transmission-drive system 10 for a motor vehicle includes a transmission 12 receiving a drive torque from an engine 14 via an input connector 16. The input connector 16 is fixed to a transmission flex plate 18 which rotates with the rotational speed of the input connector 16. A torque converter 20 is positioned within a transmission housing 22. The torque converter 20 generally includes a pump 24, a turbine 26, and a stator 28 positioned within a torque converter housing 30. The turbine 26 defines the output of the torque converter 20 and is fluidly driven by rotation of the pump 24. The stator 28 is located between the pump 24 and the turbine 26. The stator 28 provides a reaction to multiply torque within the torque converter 20. The torque converter housing 30 is connected to the flex plate 18 and therefore co-rotates during rotation of a crankshaft of the engine 14. The pump 24 is coupled to the torque converter housing 28 and therefore also co-rotates with the engine 14. The turbine 26 provides the torque output of the transmission drive system 10 and rotates a turbine housing 32 which in turn axially rotates a turbine shaft 34 defining a transmission output drive component.

To mitigate against the vibrational frequencies of the engine 14 being transferred through the turbine shaft 34, a damper system 36 is coupled to the turbine shaft 34 between the flex plate 18 and the torque converter housing 30. The damper system 36 isolates engine torque pulsations between the engine drive component 16 and the turbine shaft 34 when a torque converter clutch (defined below) is closed. To couple or de-couple selected components of the damper system 36 to the turbine shaft 34 a hydraulically actuated clutch 38 is provided, which is connected for example using a spline gear 40 to the turbine shaft 34. To reduce engine torsional vibration at higher engine operating speeds, a first set of springs 42 of the damper system 36 are coupled to the torque converter 20 clutch plate when the torque converter clutch is closed, with hydraulic or transmission fluid pressure also charged to engage elements the hydraulically actuated clutch 38.

The damper system 36 also includes a second set of springs 44. To increase the effective range of torsional vibration reduction at lower engine operating speeds, for example at or below approximately 1400 rpm, hydraulic pressure is released from the hydraulically actuated clutch 38 thereby disengaging the clutch elements of the hydraulically actuated clutch 38. The second set of springs 44 have a spring constant selected to act as a dynamic absorber at lower frequencies and lower speeds of engine operation. With the hydraulically actuated clutch 38 disengaged, the second set of springs 44 act to damp low frequency engine torque pulsations between the engine drive component 16 and the turbine shaft 34. The damper system 36 therefore provides both a first and a second range of torsional vibration reduction between the input connector 16 and a final drive unit 46 for the vehicle, which commonly includes items such as a differential and first and second axle half-shafts and remaining members of the gear box, not shown.

The hydraulically actuated clutch 38 includes a clutch housing 48 which as previously discussed is connected using the spline gear 40 to the turbine shaft 34. The clutch housing 48 provides multiple flow paths for hydraulic fluid, and therefore is provided in several locations with seals, which include first and second seals 50a, 50b positioned between the clutch housing 48 and the turbine shaft 34. A clutch apply piston 52 is slidably disposed in the clutch housing 48 and is sealed for sliding motion against the clutch housing 48 using a first apply piston seal 54a and a second apply piston seal 54b. A pressure plate 56 is rotatably disposed with respect to the clutch housing 48 and is sealed against hydraulic fluid leakage using a pressure plate seal 58. The pressure plate 56 can be rotatably coupled to the flex plate 18 using a friction plate 60 defining a torque converter clutch. The clutch housing 48 also contains a hub 62 which is rotatably supported on the turbine shaft 34 using a hub seal 64.

According to several aspects, the damper system 36 is positioned in a space 66 defined between the pressure plate 56 and the turbine housing 32. The first set of springs 42 are independently retained by a first spring cage 68 of the damper system 36 which is located within the space 66. The first spring cage 68 includes a first cage portion 69 defined by a first cage element 70 having multiple spring engagement ends 71 contacting individual spring pairs of the first set of springs 42, and at an opposite end provides a connection end 72 splined to the clutch housing 48 by a spline gear 73. The first cage element 70 therefore rotates together with the clutch housing 48 which is splined to the turbine shaft 34. A second cage portion is defined by a spring support housing 74 which is connected to the friction plate 60, and is engaged by the friction plate 60. When pressure acting against the pressure plate 56 reaches a minimum threshold pressure, for example the pressure occurring at or above a predetermined threshold engine speed, the torque converter clutch is closed or engaged, the pressure plate 56 engages the friction plate 60, and the spring support housing 74 is axially rotated together with the pressure plate 56 and the flex plate 18. The spring support housing 74 includes multiple housing portions which are coupled by one or more housing fasteners 74a, such as rivets.

The multiple springs of the first set of springs 42, which according to several aspects define overlapping pairs of compression springs, are positioned between and compressed by relative angular rotation between the first cage portion defined by the multiple spring engagement ends 71 of the first cage element 70, and the second cage portion defined by the spring support housing 74, as the first cage element 70 rotates with respect to the spring support housing 74. Torsional vibration reduction is achieved in part by compression and subsequent expansion of the spring pairs of the first set of springs 42, which store and release the energy received by angular rotation between the first cage portion and the second cage portion of the first spring cage 68.

Referring to FIG. 2 and again to FIG. 1, according to several aspects, the spring cage 68 supports the multiple springs of the first spring set 42. The springs of the first spring set 42 are pairs of springs, each pair including a first larger diameter spring defining a first stage spring and a second smaller diameter spring defining a second stage spring disposed within the larger diameter spring. In one exemplary aspect, the first spring set 42 includes ten spring pairs identified as spring pairs 42a, 42b, 42c, 42d, 42e, 42f, 42g, 42h, 42j, 42k. The quantity of spring pairs can also be greater or less than ten. Each of the spring pairs of the first set of springs 42 includes for example a first stage spring 42a1 and a second stage spring 42a2. Each spring pair is separated from a successive spring pair and is contacted by one of the multiple spring engagement ends 71 of the first cage element 70. According to several aspects, the springs of the first set of springs 42 deflect in an angular range of approximately five to fifteen degrees.

Referring again to FIG. 1, the second set of springs 44 are independently retained by a second spring cage 75 of the damper system 36 which is also located within the space 66. The second spring cage 75 includes a first cage section defined by a cage body member 76 having multiple spring engagement elements 77 contacting one of the second set of springs 44, and at an opposite end provides a connection end 78 splined to the clutch housing 48 by a spline gear 80. The second spring cage 75 therefore rotates together with the clutch housing 48 which is splined to the turbine shaft 34. The second spring cage 75 also includes a second cage section defined by a spring support housing 82 fixedly connected to the turbine 32. The second cage portion is defined by a connector leg 84 connected to the spring support housing 82 by fasteners 86. The connector leg 84 and the spring support housing 82 together support the second set of springs 44. The spring support housing 82 is fixedly connected to the turbine 32 and to a support plate 88 using a fastener 90 such as a rivet, therefore the spring support housing 82, the connector leg 84, and the support plate 88 rotate together with the turbine housing 32. The support plate 88 is fixed to the hub 62 of the hydraulically actuated clutch 38 for example by welding. The spring support housing 82 and the connector leg 84 are coupled by one or more of the fasteners 86, such as rivets.

The multiple springs of the second set of springs 44, which according to several aspects are coiled compression springs, are positioned between and compressed by relative angular rotation between the first cage section defined by the spring engagement elements 77 of the cage body member 76, and the second cage section defined by the spring support housing 82, as the cage body member 76 rotates with respect to the spring support housing 82. Torsional vibration reduction is achieved in part by compression and subsequent expansion of the second set of springs 44, which store and release the energy received by angular rotation. According to several aspects, the springs of the second set of springs 44 deflect in an angular range of approximately one to three degrees.

Figure 2:
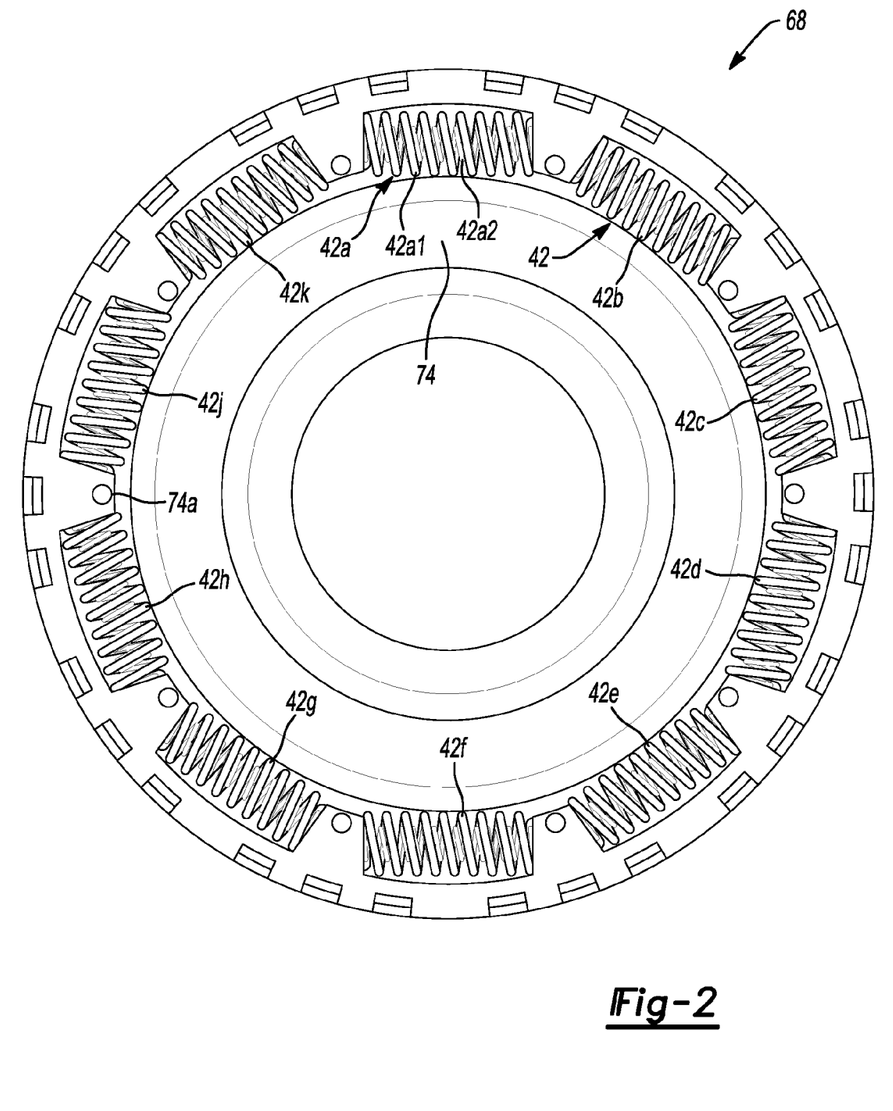
FIG. 2 is a front elevational view of a spring cage of the present disclosure.
Figure 5:
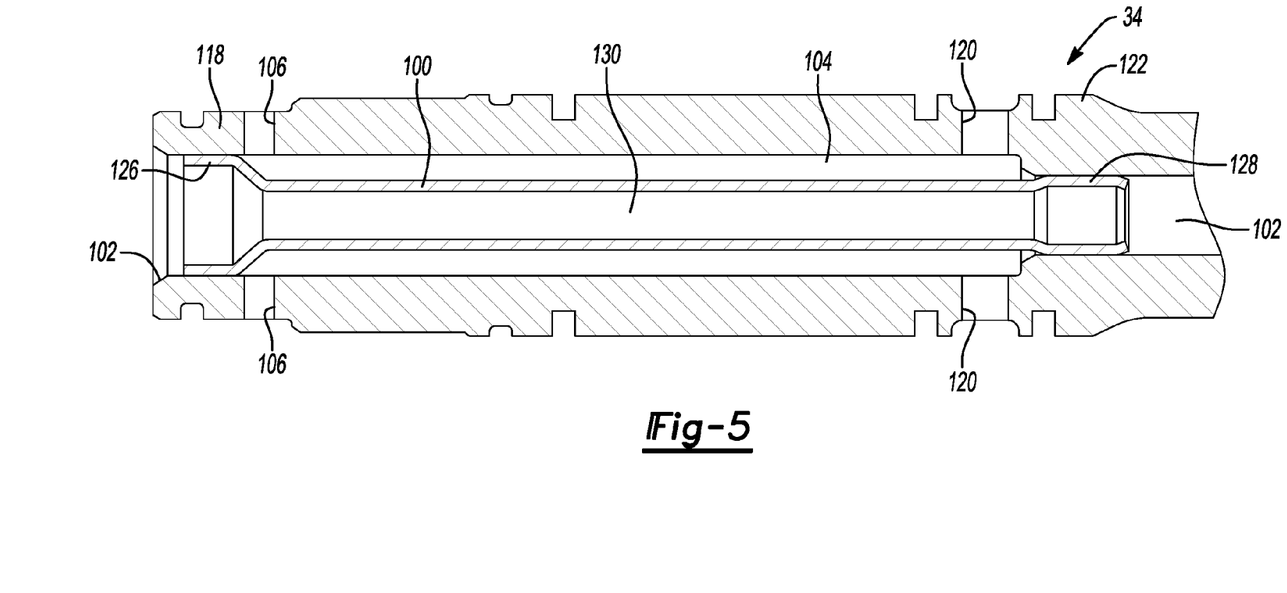
FIG. 5 is a cross sectional view taken at section 5 of FIG. 4.

Referring to FIG. 3 and again to FIGS. 1 through 2, the hydraulically actuated clutch 38 includes a plurality of friction plates 92 fixed to individual connecting members 93 which are in turn fixed to a flange 94 of the clutch housing 48. A plurality of reaction plates 96 are interleaved between successive ones of the friction plates 92. The reaction plates 96 are each fixed to a shoulder 98 of the hub 62. According to other aspects, the friction plates 92 and the reaction plates 96 can be reversed, having the reaction plates 96 fixed to the individual connecting members 93 and the friction plates 92 each fixed to the shoulder 98 of the hub 62. Hydraulic fluid pressure applied to the clutch apply piston 52 slidably displaces the clutch apply piston 52 in an apply direction "A" forcing the friction plates 92 into direct frictional contact with the reaction plates 96. Frictional contact between the friction plates 92 and the reaction plates 96 rotatably locks the turbine shaft 34 to the turbine 32. To direct pressurized hydraulic fluid to the clutch apply piston 52, a sleeve 100 is disposed within a longitudinal bore 102 of the turbine shaft 34. The sleeve 100 separates the longitudinal bore 102 into an inner passage 130 shown and described below in reference to FIG. 5, and an outer passage 104, the outer passage 104 defining a path supplying hydraulic fluid to the friction clutch assembly.

Hydraulic fluid is directed through the outer passage 104, and exits through a plurality of connecting passages 106 extending through a wall of the turbine shaft 34 which are oriented substantially perpendicular to the longitudinal bore 102. From the connecting passages 106, the hydraulic fluid flows through each of a receiving slot 108 and a hydraulic fluid clutch apply passage 110 created in the clutch housing 48. Within the clutch housing 48, the hydraulic fluid enters a chamber 112, therein forcing translation of the clutch apply piston 52 in the apply direction "A". The first apply piston seal 54a and the second apply piston seal 54b retain the hydraulic fluid pressure in the chamber 112 during translation of the clutch apply piston 52. Translation of the clutch apply piston 52 in the apply direction "A" acts against the biasing force of a biasing element 114. The biasing element 114 normally acts to displace the clutch apply piston 52 in a return direction "B" opposite to the apply direction "A", which therefore returns the clutch apply piston 52 in the return direction "B" to the non-displaced position shown in FIG. 3 when the hydraulically actuated clutch 38 is disengaged. As the clutch apply piston 52 translates, exhaust hydraulic fluid is discharged via a discharge passage 116.

Referring to FIG. 4 and again to FIGS. 1 through 2, the turbine shaft 34 includes a tubular shaped body 116 having the multiple connecting passages 106 located in a first portion 118 of the body 116. The longitudinal bore 102 extends through a substantial length of the turbine shaft 34. A second set of connecting passages 120 extend through the wall of the turbine shaft 34 at a shaft second portion 122 and are in fluid communication with and are oriented substantially perpendicular to the outer passage 104. The connecting passages 120 provide for input of the hydraulic fluid into the outer passage 104 which is used for actuating the hydraulically actuated clutch 38. The turbine shaft 34 may also provide one or more rotational support members or bearings such as a needle bearing assembly 124 and support surfaces such as for rotational bushings.

Figure 4:
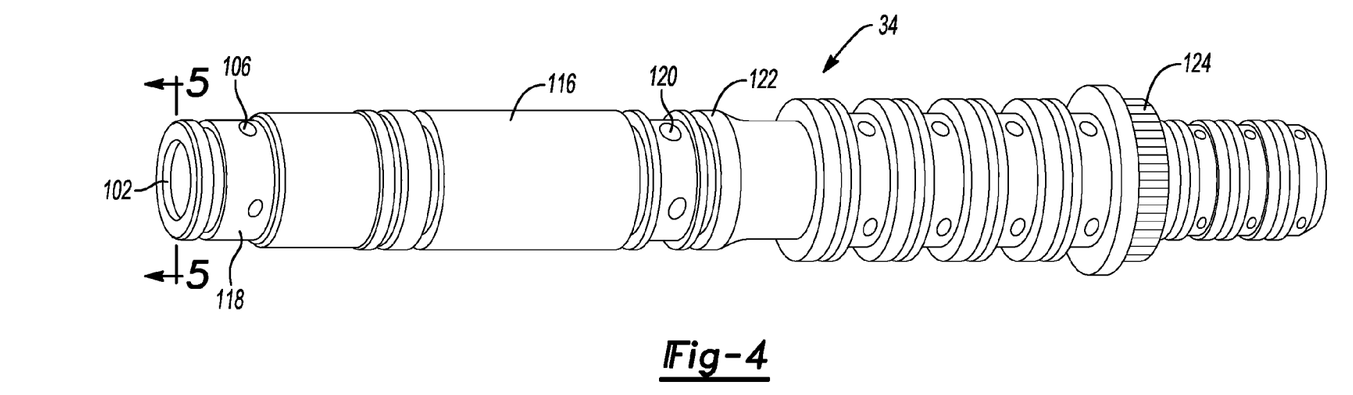
FIG. 4 is a front perspective view of a turbine shaft of the transmission assembly of FIG. 1.

Referring to FIG. 5 and again to FIG. 4, the sleeve 100 is positioned within the longitudinal bore 102 having a first swaged end 126 abutting the inner wall of the longitudinal bore 102 of the first portion 118. A second swaged end 128 abuts the inner wall of the longitudinal bore 102 of the second portion 122. The sleeve 100 thereby separates the outer passage 104 from a central inner passage 130. The second set of connecting passages 120 extend through the wall of the turbine shaft 34 at the second portion 122 and are in fluid communication with the connecting passages 106 via the outer passage 104.

Figure 3:
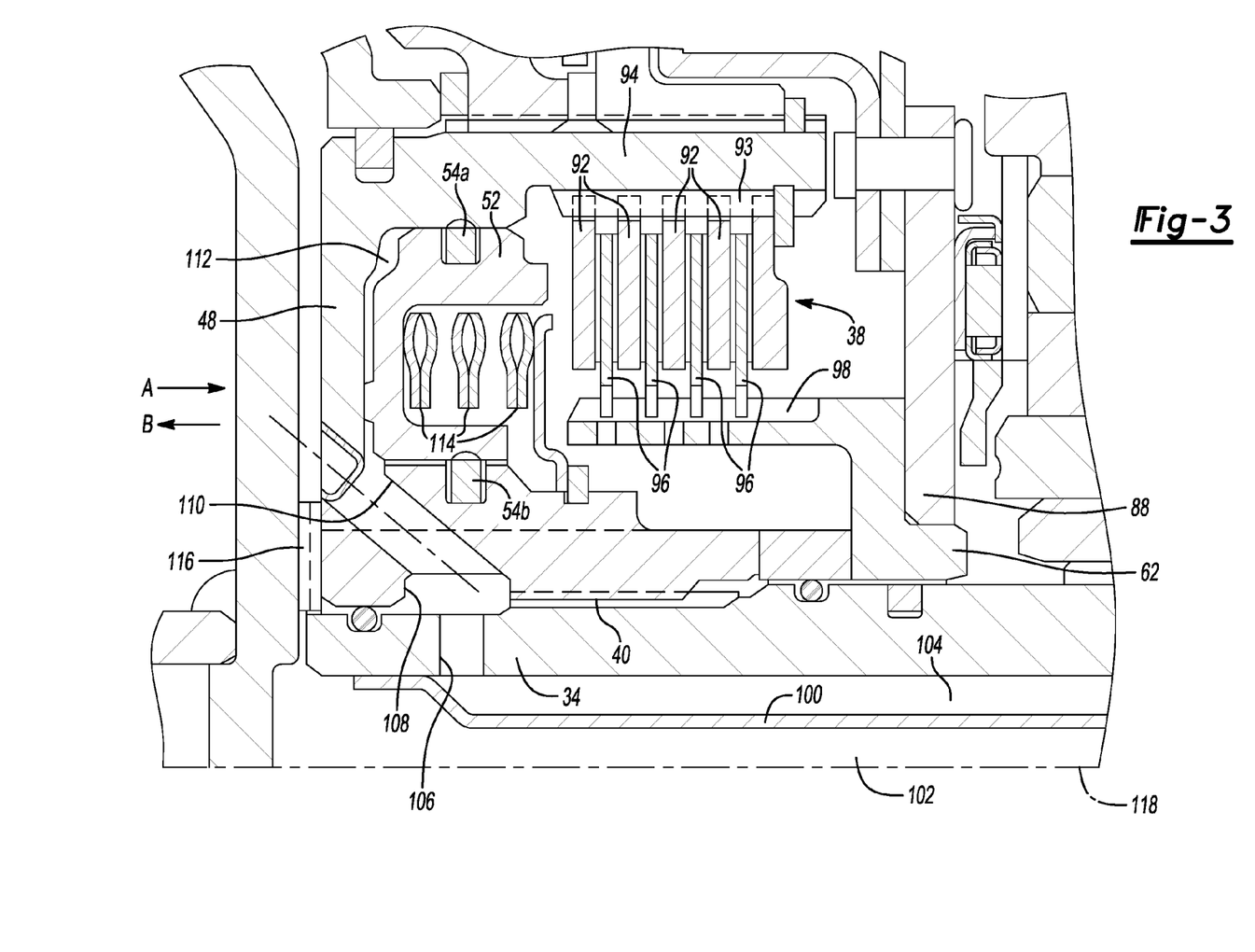
FIG. 3 is a partial cross sectional front elevational view of area 3 of FIG. 1.
Figures 6, 7:
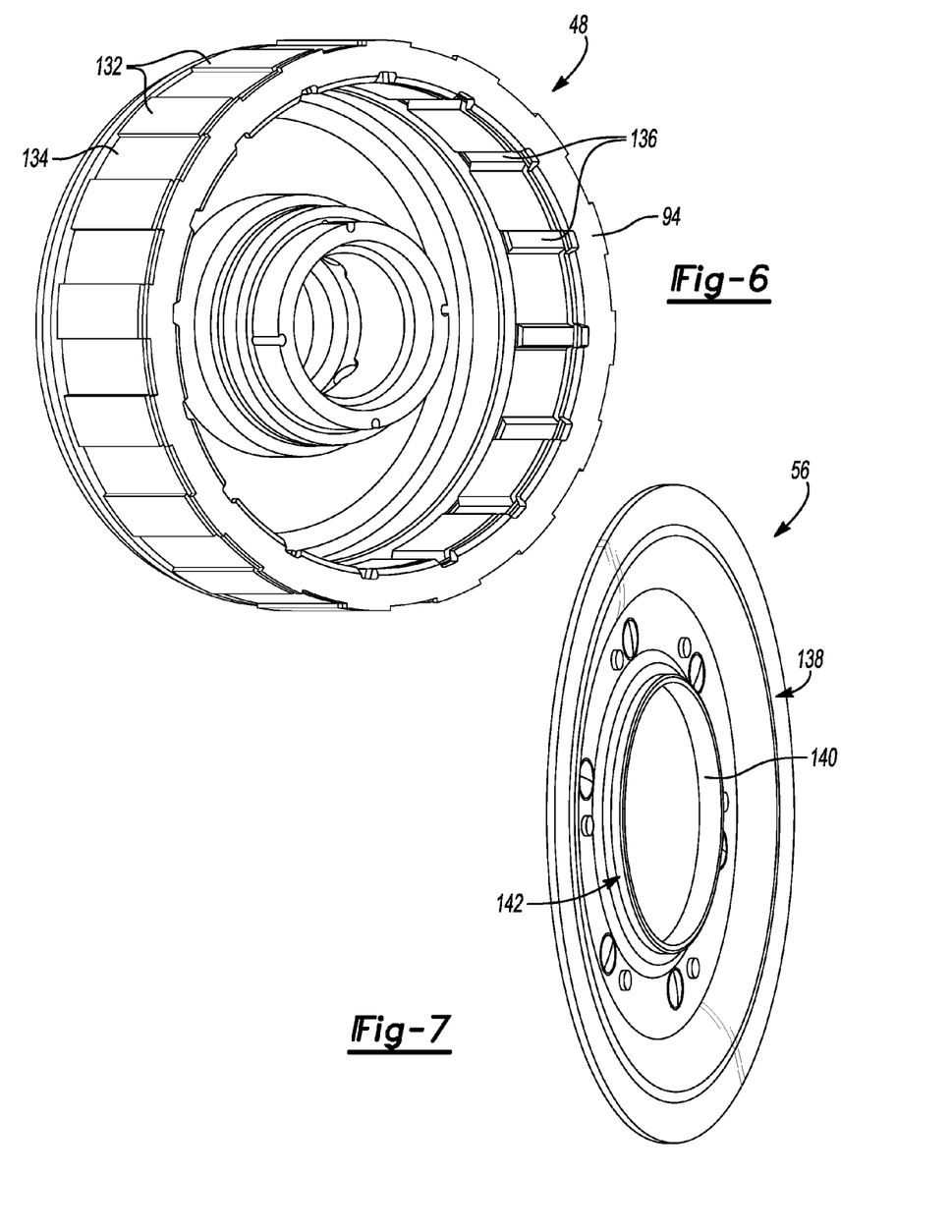
FIG. 6 is a front right perspective view of a clutch housing for a hydraulically actuated clutch of the present disclosure.
FIG. 7 is a front right perspective view of a pressure plate for the transmission assembly of FIG. 1.

Referring to FIG. 6 and again to FIGS. 1 and 3, the clutch housing 48 includes spline gear teeth 132 created on a circular shaped perimeter wall 134. The spline gear teeth 132 mesh with the spline gear 73 of the connection end 72 of the first cage element 70, and with the spline gear 80 of the connection end 78 of the cage body member 76. Multiple axial slots 136 provide for engagement of the connecting members 93 which support the reaction plates 92 shown and described in reference to FIG. 3.

Referring to FIG. 7 and again to FIG. 1, the pressure plate 56 includes a generally planar contact face 138 which directly contacts the friction plate 60 when pressurized hydraulic fluid is applied to the pressure plate 56 within the space 66 defined between the pressure plate 56 and the turbine 32. A centrally positioned flange 140 extends in an axial direction and includes an outer flange surface 142 which is rotatably supported by the pressure plate seal 58 described in reference to FIG. 1.

It should also be appreciated that the damper system 36 of the present disclosure may have other configurations, such as having fewer or greater than ten springs of the first spring set 42, and fewer or greater than six springs of the second spring set 44. Modifications with respect to the size and spring coefficients or spring rates, or to a diameter of the springs in their support members as they are arranged in the two spring sets can also be made without departing from the scope of the present disclosure.

According to several aspects of the present disclosure, a damper system 36 for a motor vehicle transmission 12 includes a turbine shaft 34 rotatably connected to a torque converter 20. A hydraulically actuated hydraulically actuated clutch 38 is connected to the turbine shaft 34. A first spring cage 68 has a first cage portion 69 connected to the hydraulically actuated clutch 38 and a second cage portion 74 releasably engageable to a friction plate 60 which is coupled with a pressure plate 56 when the clutch is closed. A first spring set 42 is connected to the first cage portion 69 and the second cage portion 74. Multiple springs of the first spring set 42 are deflected by axial rotation between the first cage portion 69 and the second cage portion 74 when the clutch 60 is frictionally engaged. A second spring cage 75 has a first cage section 76 connected to the hydraulically actuated clutch 38 and a second cage section 82 fixedly connected to a turbine 32 of the torque converter 20. A second spring set 44 has multiple second springs each having a spring constant different than a spring constant of the springs of the first spring set 42. Multiple springs of the second spring set 44 are deflected by axial rotation between the first cage section 76 and the second cage section 82 when the hydraulically actuated clutch 38 is disengaged.

The description of the invention is merely exemplary in nature and variations that do not depart from the general gist of the invention are intended to be within the scope of the invention. Such variations are not to be regarded as a departure from the spirit and scope of the invention.

What is claimed is:

1. A damper system for a motor vehicle transmission having a turbine shaft rotatably connected to a torque converter, comprising:
   a hydraulically actuated clutch connected to the turbine shaft and rotatable with the turbine shaft;
   a first spring cage having a first cage portion connected to the hydraulically actuated clutch and a second cage portion connected to a friction plate of a torque converter clutch which is coupled with a pressure plate when the torque converter clutch is engaged; and
   a first spring set connected to the first and the second cage portions of the first spring cage, multiple springs of the first spring set being deflected by axial rotation between the first and the second cage portions when the torque converter clutch is frictionally engaged, which releasably couples the first and the second cage portions of the first spring cage to the turbine shaft.

2. The damper system for a motor vehicle of claim 1, further including a second spring cage having a first cage section connected to the hydraulically actuated clutch and a second cage section connected to a turbine of the torque converter.

3. The damper system for a motor vehicle of claim 2, further including a second spring set having multiple second springs connected to the second spring cage each having a spring constant different than a spring constant of the springs of the first spring set, wherein the multiple second springs of the second spring set are deflected by axial rotation between the first cage section and the second cage section when the hydraulically actuated clutch is frictionally disengaged.

4. The damper system for a motor vehicle of claim 3, wherein the springs of the second set of springs deflect in an angle depending on a torque vibration amplitude.

5. The damper system for a motor vehicle of claim 1, wherein the hydraulically actuated clutch includes a clutch housing having multiple friction or reaction plates fixed to the clutch housing, the clutch housing connected to the turbine shaft.

6. The damper system for a motor vehicle of claim 5, wherein the hydraulically actuated friction clutch assembly further includes a hub axially rotatable with respect to the clutch housing and fixed to a turbine of the torque converter, the hub having multiple friction or reaction plates fixed to the hub, the friction or reaction plates of the hub interleaved with opposite ones of the friction or reaction plates inside the clutch housing.

7. The damper system for a motor vehicle of claim 1, wherein the springs of the first set of springs deflect in an angle dependent on a torque and vibration amplitude.

8. The damper system for a motor vehicle of claim 1, further including a sleeve disposed in a longitudinal bore of the turbine shaft, the sleeve separating the longitudinal bore into an inner passage and an outer passage, the inner or the outer passage defining a path supplying hydraulic fluid to the hydraulically actuated clutch.

9. The damper system for a motor vehicle of claim 8, further including a clutch housing of the hydraulically actuated clutch having a hydraulic fluid clutch apply passage, the hydraulic fluid clutch apply passage in fluid communication with the inner or the outer passage defined by the sleeve.

10. The damper system for a motor vehicle of claim 8, wherein the turbine shaft further includes multiple connecting passages extending through a wall of the turbine shaft, the connecting passages in fluid communication with the inner or the outer passage defined by the sleeve.

11. The damper system for a motor vehicle of claim 1, further including a pressure plate or a piston rotatably supported on a clutch housing of the hydraulically actuated clutch.

12. The damper system for a motor vehicle of claim 11, further including a friction plate frictionally coupling the pressure plate or the piston to a flex plate of the transmission when hydraulic pressure is applied to the pressure plate.

13. The damper system for a motor vehicle of claim 11, wherein the damper is positioned in a space inside the torque converter and connected between the pressure plate or the piston and a turbine of the torque converter.

14. The damper system for a motor vehicle of claim 2, wherein the hydraulically actuated clutch is connected to the turbine shaft by a spline gear, and each of the first cage portion and the first cage section are splined to the a clutch housing of the hydraulically actuated clutch.

15. A damper system for a motor vehicle transmission having a turbine shaft rotatably connected to a torque converter having a torque converter clutch, comprising:
  a hydraulically actuated clutch coupled to the turbine shaft;
  a first spring cage having a first cage portion connected to the hydraulically actuated clutch and a second cage portion connected to a friction plate of the torque converter clutch which is coupled with a pressure plate when the torque converter clutch is closed;
  a first spring set connected to the first cage portion and the second cage portion, multiple springs of the first spring set being deflected by axial rotation between the first cage portion and the second cage portion when the hydraulically actuated clutch is frictionally engaged;
  a second spring cage having a first cage section connected to the hydraulically actuated clutch and a second cage section fixedly connected to a turbine of the torque converter; and
  a second spring set having multiple second springs each having a spring constant different than a spring constant of the springs of the first spring set, multiple springs of the second spring set being deflected by axial rotation between the first cage section and the second cage section.

16. The damper system for a motor vehicle of claim 15, wherein the hydraulically actuated clutch further includes a clutch housing having multiple friction plates or reaction plates fixed to the clutch housing.

17. The damper system for a motor vehicle of claim 16, wherein the hydraulically actuated clutch further includes a hub fixed to the turbine and axially rotatable with respect to the clutch housing, the hub having multiple friction plates or reaction plates fixed to the hub, the friction plates or the reaction plates of the hub interleaved with opposite ones of the friction plates or the reaction plates of the clutch housing.

18. The damper system for a motor vehicle of claim 17, wherein the multiple springs of the second spring set are deflected by axial rotation between the first cage section and the second cage section when the friction plates or the reaction plates of the hub are frictionally disengaged from the opposite ones of friction plates or the reaction plates of the clutch housing.

19. The damper system for a motor vehicle of claim 14, wherein the multiple springs of the second spring set are deflected by axial rotation between the first cage section and the second cage section whenever the hydraulically actuated clutch is disengaged.

20. A powertrain for a motor vehicle comprising:
  an engine disposed in the motor vehicle;
  an automatic transmission connected to the engine having a turbine shaft and a pressure plate;
  a torque converter connected to the turbine shaft by a torque converter clutch; and
  a damper system, including:
    a hydraulically actuated clutch coupled to the turbine shaft;
    a first spring cage having a first cage portion connected to the hydraulically actuated clutch and a second cage portion connected to a friction plate of the torque converter clutch which is coupled to the pressure plate when the torque converter clutch is frictionally engaged;
    a first spring set connected to the first cage portion and the second cage portion, multiple springs of the first spring set being deflected by axial rotation between the first cage portion and the second cage portion when the torque converter clutch is frictionally engaged;
    a second spring cage having a first cage section connected to the hydraulically actuated clutch and a second cage section fixedly connected to a turbine of the torque converter; and
    a second spring set having multiple second springs each having a spring constant different than a spring constant of the springs of the first spring set, multiple springs of the second spring set being deflected by axial rotation between the first cage section and the second cage section.

* * * * *